United States Patent
Li et al.

(10) Patent No.: US 11,121,539 B2
(45) Date of Patent: Sep. 14, 2021

(54) DC SOLID-STATE CIRCUIT BREAKER WITH SELF-ADAPT CURRENT LIMITING CAPABILITY AND THE CONTROL METHOD THEREOF

(71) Applicant: Tianjin University, Tianjin (CN)

(72) Inventors: Bin Li, Tianjin (CN); Jiawei He, Tianjin (CN)

(73) Assignee: Tianjin University, Tianjin (CN)

( * ) Notice: Subject to any disclaimer, the term of this patent is extended or adjusted under 35 U.S.C. 154(b) by 104 days.

(21) Appl. No.: 16/306,580

(22) PCT Filed: Jun. 22, 2017

(86) PCT No.: PCT/CN2017/089644
§ 371 (c)(1),
(2) Date: Dec. 2, 2018

(87) PCT Pub. No.: WO2018/218713
PCT Pub. Date: Dec. 6, 2018

(65) Prior Publication Data
US 2021/0226439 A1 Jul. 22, 2021

(30) Foreign Application Priority Data

May 31, 2017 (CN) .......................... 201710399243.0

(51) Int. Cl.
*H02H 3/08* (2006.01)
*H02H 3/087* (2006.01)
*H02H 3/02* (2006.01)
*H02H 1/06* (2006.01)

(52) U.S. Cl.
CPC .............. *H02H 3/087* (2013.01); *H02H 1/06* (2013.01); *H02H 3/021* (2013.01)

(58) Field of Classification Search
CPC ........... H02H 3/021; H02H 3/087; H02H 1/06
USPC ........................................................ 363/93.9
See application file for complete search history.

(56) References Cited

U.S. PATENT DOCUMENTS

| | | | |
|---|---|---|---|
| 10,454,265 B2 * | 10/2019 | Cao ........................ | H01H 33/596 |
| 2002/0118500 A1 * | 8/2002 | Covi ...................... | H02H 3/087 361/93.1 |
| 2015/0116881 A1 * | 4/2015 | Burnett .................. | H02H 3/087 361/93.1 |
| 2015/0372473 A1 * | 12/2015 | Wang ..................... | H01H 9/542 361/57 |

(Continued)

*Primary Examiner* — Yemane Mehari
(74) *Attorney, Agent, or Firm* — George C. Wang; Bei & Ocean

(57) ABSTRACT

The present invention discloses a DC solid-state circuit breaker with self-adapt fault current limiting capability. The topology of the DC solid-state circuit breaker is a H-bridge circuit consisting of two unidirectional breakable bridge arms and two series-connected diode bridge arms, wherein the two unidirectional breakable bridge arms are connected in series to the two series-connected diode bridge arms in a same direction to form two series branches, respectively; the series branches are connected in parallel; a series branch formed by a DC reactor L and a DC biased power supply is connected to the PCC between the two unidirectional breakable bridge arms and the PCC between the two series-connected diode bridge arms; the DC line is connected to the two PCCs, respectively.

4 Claims, 6 Drawing Sheets

(56) References Cited

U.S. PATENT DOCUMENTS

2016/0006236 A1* 1/2016 Tang .................... H01H 33/596
361/91.5
2017/0178844 A1* 6/2017 Angquist ................. H02H 3/08

* cited by examiner (a) fault current limiting state (b) fault current clearing state

DC SOLID-STATE CIRCUIT BREAKER WITH SELF-ADAPT CURRENT LIMITING CAPABILITY AND THE CONTROL METHOD THEREOF

TECHNICAL FIELD

The present invention relates to the field of DC power transmission networks/power distribution networks/microgrids, and in particular to a novel DC solid-state circuit breaker (SSCB).

BACKGROUND OF THE PRESENT INVENTION

In present, the typical converters in the flexible DC system mainly include two-level voltage source converters (hereinafter referred to as VSCs), three-level VSCs and modular multilevel converters (hereinafter referred to as MMCs). However, all the flexible DC systems based on the above converters must confront a severe challenge: after DC faults, the fault current rises sharply, and the DC voltage drops rapidly, which seriously endangers the operation security of the system. Even if the converter station is quickly blocked, the AC-side source will still feed the fault current to the fault point through the freewheeling diodes of the converter in an uncontrolled rectification manner. It means that the DC fault current in the flexible DC system has no natural zero-crossing point, so the arc extinguishing of the DC fault is very difficult.

In view of the DC fault current rapid rise rate and difficult isolation, related researches (for example, U.S. Pat. No. 9,130,477B2) provided an improved converter topology with DC fault self-clearing capability. After DC faults, the improved topology can quickly clear the fault current by blocking itself. In a point-to-point flexible DC system, a DC fault will inevitably lead to the interruption of power transmission, and there is not a so-called remanent network, so that the improved converter with self-clearing capability has good applicability. However, in a multi-terminal DC power grid, DC lines are directly connected to each other through DC buses. When a fault occurs on one line, the remanent network formed by the converter stations and the remaining lines should ensure reliable fault ride-through and thus improve the system power supply reliability. The improved converter with self-clearing capability will lead to a short power outage of the whole system. Therefore, it is most ideal to isolate the fault line quickly and selectively based on the DC circuit breaker (DCCB) and selective protection, to ensure the reliable fault ride-through of the remanent healthy network.

According to the DC fault transient characteristics, the DC fault propagation speed is extremely fast, which means the fault current increases very fast and the DC voltage drops instantaneously after DC faults. It means the MMC will be blocked within several milliseconds or even several hundred microseconds due to IGBT self-protection, leading to the failure of the healthy network ride-through. Therefore, it requires the protection and DCCB can locate (fault line location) and isolate the fault line with selectivity in several milliseconds or even hundreds of microseconds. At present, the fastest DCCB is already able to realize fault isolation within hundreds of microseconds, for example, the DC solid-state circuit breaker disclosed in U.S. Pat. No. 5,999,388. It should be noted that, such quick fault isolation is realized under the premise that the selective protection can locate the fault line within hundreds of microseconds (or even faster) after DC faults. While the existing protection technologies can still not detect and locate the DC fault such quickly, especially, when the acting reliability is also required. Moreover, the performance reliability of protection is directly related to a judgment time window, but it is very difficult to distinguish a fault from a disturbance within the judgment time window of hundreds of microseconds or milliseconds. Therefore, even if there is a protection principle under the judgment time window, the performance reliability still needs to be verified by tests. In view of the contradiction between the rapid propagation of DC faults and the slow performance of DC protection, the most ideal handling method is to slow the propagation speed of the DC faults by effective current limiting technologies, which ensures the reliable fault ride-through of the remanent healthy network, and creates a sufficient time for the selective protection and the circuit breaker.

The solid-state circuit topology provided in U.S. Pat. No. 5,999,388 can realize the fault current clearing and also a fault current limiting function. However, for the fault current limiting function, a high-frequency on-and-off control will be applied on the controllable switching devices, which is very detrimental to their service life. In addition, this kind of current limiting characteristic is mainly resistive current limiting. Actually, it is not very ideal to limit the rise rate of the current by resistive current limiting during the initial stage of the DC fault. Differently, the reactive fault current limiting has a good limiting effect on the current rise rate. Therefore, the existing flexible DC systems are more inclined to install reactors at both ends of the DC line. After DC faults, the rapid rise of the fault current and the rapid drop of the DC voltage can be limited by the reactors, namely, the propagation speed of the fault is slowed. So the requirements on the acting speed of the protection and the DC circuit breaker can be reduced. However, lots of reactors directly installed in the DC system are very disadvantageous to the transient response speed, and even the operation stability of the system, especially during the power flow shifting. In addition, due to the freewheeling current of the reactors, the fault current clearing time after the DCCB being tripped will be prolonged drastically. This is disadvantageous to the quick removal of the fault and then the quick recovery of the healthy remanent network. Moreover, the arrester capacity of the DCCB must be larger under this condition, because it needs to dissipate the additional fault energy of the DC reactor. Therefore, how to avoid negative influences of the fault current limiting reactor, and realize the effective coordination between the fault current limitation, protection and isolation, becomes the key technique for the DC fault handling in the flexible DC grid.

SUMMARY OF THE PRESENT INVENTION

In view of the quick propagation speed and large damage of the DC fault in the flexible DC grid, the present invention provides a DC solid-state circuit breaker with self-adapt fault current limiting capability and the control method thereof. The proposed SSCB can limit the DC fault current quickly and automatically before the tripping signal from the protection is received. In addition, the negative influences of the fault current limiting reactor are avoided.

The present invention provides a DC SSCB with self-adapt fault current limiting capability, wherein the topology of the proposed DC SSCB is a H-bridge circuit consisting of two unidirectional breakable bridge arms and two series-connected diode bridge arms; the two unidirectional breakable bridge arms are connected in series to the two series-connected diode bridge arms in a same direction, respectively, to form two series branches; the bridge arms in the two series branches are arranged in the same way, that is, the unidirectional breakable bridge arms are arranged at high-side and the series-connected diode bridge arms are arranged at lower-side or the series-connected diode bridge arms are arranged at high-side and the unidirectional breakable bridge arms are arranged at lower-side; the series branches are connected in parallel, and the parallel connection of the two series branches follows the rule that the same bridge arms form a point of common coupling (hereinafter referred to as PCC); a series branch composed of a DC reactor L and a DC bias power supply is connected to the PCCs of the unidirectional breakable bridge arms and the series-connected diode bridge arms respectively; and, the DC line is connected to the above two PCCs.

Each of the unidirectional breakable bridge arms is formed by connecting N unidirectional breakable modules in series and then connecting them to an arrester in parallel; and, each of the unidirectional breakable modules is formed by a full-controlled solid-state switch, an anti-paralleled diode and a series-connected diode.

Each series-connected diode bridge arm consists of N diodes connected in series.

The method for controlling the proposed DC SSCB of the present invention includes control strategies for the normal operation state, the fault current limiting state, the fault current clearing state and the recovery state, wherein the control strategies specifically include the following processes:

During normal operation state, turning on all the full-controlled solid-state switches in the SSCB; setting the biased current $I_b$ to be a little larger than the maximum load current possibly occurring during the normal operation. Under this condition, the DC reactor in the SSCB is bypassed from the DC line;

In the fault current-limiting state, after DC faults, keeping the gate signals of the full-controlled solid-state switches unchanged until the protection action signal is received; rising the DC line current to exceed the DC biased current value $I_b$, and quickly connecting a DC reactor to a fault circuit after the fault; since the biased current value $I_b$ is set to be a little larger than the maximum load current, the time from the fault moment to the reactor connected-in moment is very short. It means the proposed SSCB can exert the fault current limiting capability very quickly after the dc fault, and guaranteeing the reliable fault ride-through of the remanent healthy network;

In the arrangement of arranging the unidirectional breakable bridge arms at high-side and the series-connected diode bridge arms at lower-side: in the fault current clearing state, when the protection acting signal is received, turning off the corresponding full-controlled solid-state switches in the unidirectional breakable bridge arm, getting into the fault current clearing state. But the turned-off arm is different according to the fault conditions. If the fault is the positive-pole line fault, positive-pole rail fault or the negative-pole bus fault, turning off the switches in the bus-side unidirectional breakable bridge arm of the tripped SSCB; if the fault is the negative-pole line fault, negative-pole rail fault or the positive-pole bus fault, turning off the switches in the non-bus-side unidirectional breakable bridge arm of the tripped SSCB. With the above control, the fault energy in the fault circuit can be dissipated by the arrester in the turned-off unidirectional breakable bridge arm, and the DC fault current can be cleared quickly. In this state, the freewheeling current of the DC reactor produces a reverse electromotive force to make the unidirectional breakable bridge arm and the series-connected diode arm conduct automatically. Therefore, the freewheeling current of the DC reactor will only circulate in the SSCB, which means the DC reactor in the proposed SSCB is bypassed from the fault circuit again. The described control strategy for the fault current clearing state is for the topology that the unidirectional breakable bridge arms at high-side and the series-connected diode bridge arms at lower-side. Differently, for the topology the series-connected diode bridge arms at high-side and the unidirectional breakable bridge arms at lower-side, the control strategy is opposite.

In the arrangement of arranging the series-connected diode bridge arms at high-side and the unidirectional breakable bridge arms at lower-side, in the recovery state, when the fault point is disappeared, performing the following control strategy for the SSCB recovery: firstly, turning off one of the unidirectional breakable bridge arm which is still in on state, and then turning off the other unidirectional breakable bridge arm, so that the stored energy in the DC reactor can be dissipated by the arresters; turning on all the full-controlled solid-state switches in the SSCB when the freewheeling current decreases to near the pre-set DC biased current value $I_b$. It means the proposed SSCB is recovered completely so as to prepare for handling the next fault. In addition, the voltage across the SSCB is almost zero, so it can be considered that the recovery of the SSCB almost has no influence on the recovery of the DC system.

The novel DC SSCB provided by the present invention is applicable to multi-terminal flexible DC power grids, particularly to the low-voltage system, such as DC distribution system and the DC microgrid. Compared with the DC fault handling method which limits the fault current by the directly installed DC reactor and isolates the fault by the conventional DCCB, the proposed SSCB realizes the effective cooperation among the fault current limitation, protection and isolation, including the advantages as follows.

1) During the normal operation, the DC reactor in the SSCB is bypassed from the DC line, thus having no negative influence on the system normal operation, including transient response speed and operation stability.

2) After DC faults, the DC reactor will be connected into the fault circuit quickly and automatically. It can limit the fault current and slow the DC voltage dropping, guarantee the fault ride-through of the healthy network, and thus creating enough time for the protection and isolation.

3) During the fault current clearing period, the DC reactor in the SSCB is bypassed from the fault circuit again, also instantaneously and automatically. It can accelerate the fault isolation drastically, guaranteeing the fast recovery of the healthy network and fast recovery of the fault line insulation characteristic.

4) The fault part of the system can recover quickly after the fault point has disappeared. And the SSCB itself can also recover quickly, preparing for handling the next fault. Moreover, the recovery of the SSCB almost has no influence on the recovery of the DC system.

in which:

1: first bridge arm; 2: second bridge arm; 3: third bridge arm; 4: fourth bridge arm; 5: unidirectional breakable module; 6-11: installing positions of the DC SSCB; and, 121: first arrester; 122: second arrester; 123: third arrester; 124: fourth arrester.

DETAILED DESCRIPTION OF THE PRESENT INVENTION

Figure 1:
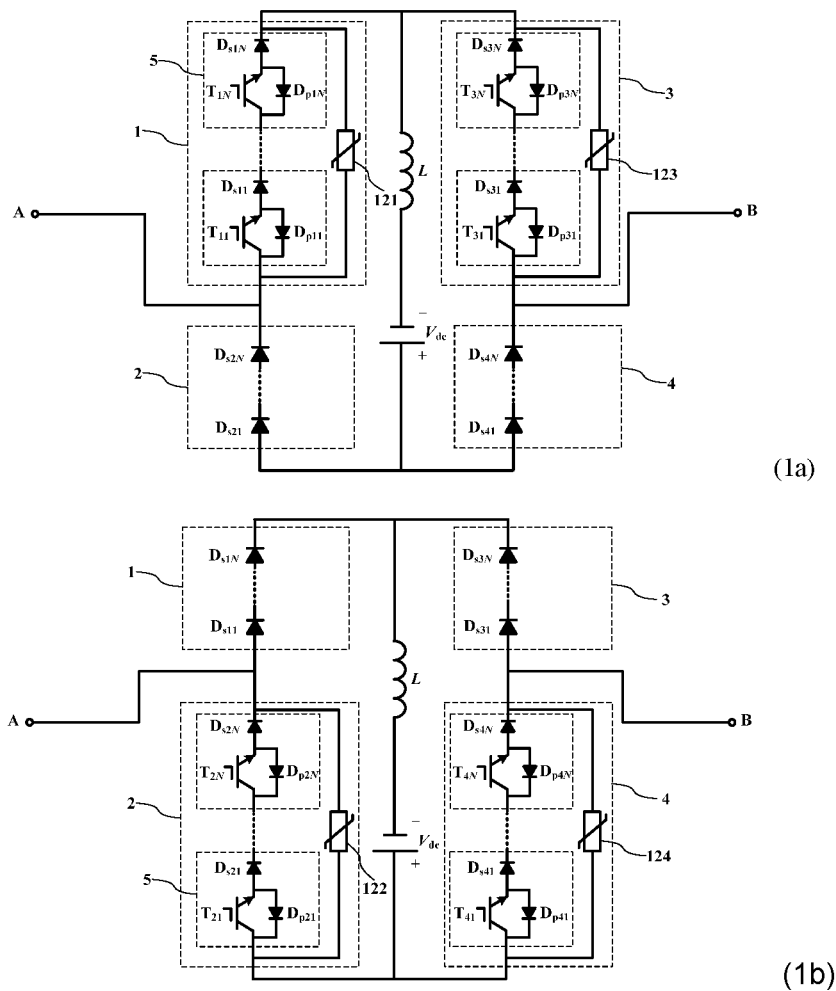
FIG. 1 is the schematic diagram of a novel DC SSCB with self-adapt fault current limiting capability according to the present invention, where FIG. 1a) is a topology schematic diagram of a first embodiment of the DC SSCB according to the present invention and FIG. 1b) is a topology schematic diagram of a second embodiment of the DC SSCB according to the present invention.
Figure 2:
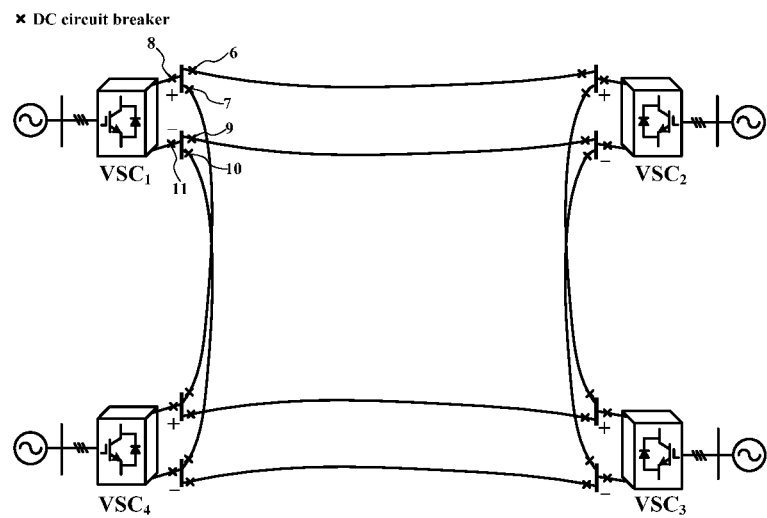
FIG. 2 is the installing position schematic diagram of the DC SSCB according to the present invention in a multi-terminal flexible DC power grid.

As shown in FIG. 1, FIG. (1a) shows the topology of the first embodiment of the DC SSCB with self-adapt fault current limiting capability according to the present invention. The topology includes a H-bridge circuit consisting of the first bridge arm 1, the second bridge arm 2, the third bridge arm 3 and the fourth bridge arm 4, wherein the first bridge arm 1 and the second bridge arm 2 are connected in series, the third bridge arm 3 and the fourth bridge arm 4 are connected in series, and the series branch formed by the first bridge arm 1 and the second bridge arm 2 is connected in parallel to the series branch formed by the third bridge arm 3 and the fourth bridge arm 4. The specific topology of the bridge arms will be described below in detail.

The first bridge arm 1 and the third bridge arm 3 are named as the unidirectional breakable bridge arms, and each of them is formed by connecting N unidirectional breakable modules 5 in series and then connecting them to the arrester (121 or 123) in parallel. Each unidirectional breakable module 5 is formed by connecting a full-controlled solid-state switch ($T_{11}$-$T_{1N}$ and $T_{31}$-$T_{34}$) (taking IGBT as example in the figures, but other full-controlled solid-state switches such as GTO or MOSFET may also be possible in practical applications) to a diode ($D_{p11}$-$D_{p1N}$ and $D_{p31}$-$D_{p3N}$) in anti-parallel and then connecting them to a diode ($D_{s11}$-$D_{s1N}$ and $D_{s31}$-$D_{s3N}$) in series in the same direction, where N can be determined according to the parameter determination principle for the conventional DC SSCB. The second bridge arm 2 and the fourth bridge arm 4 are named as the series-connected diode bridge arms, and each of them is formed by connecting N diodes ($D_{s21}$-$D_{s2N}$ and $D_{s41}$-$D_{s4N}$) in series. One terminal of the DC reactor L is connected to the PCC between the first bridge arm 1 and the third bridge arm 3, while the other terminal thereof is connected to the cathode of the DC biased power supply. The anode of the DC biased power supply is connected to the PCC between the second bridge arm 2 and the fourth bridge arm 4. The DC reactor can be wound by the copper wire. In order to reduce the conducting power loss, it can also be wound by the superconducting coil. The DC line is connected to the PCC between the first bridge arm 1 and the second bridge arm 2 and the PCC between the third bridge arm 3 and the fourth bridge arm 4, respectively.

As shown in FIG. 1, FIG. (1b) shows the topology of the second embodiment of the DC SSCB with self-adapt fault current limiting capability according to the present invention. The topology includes a H-bridge circuit consisting of the first bridge arm 1, the second bridge arm 2, the third bridge arm 3 and the fourth bridge arm 4, wherein the first bridge arm 1 and the second bridge arm 2 are connected in series, the third bridge arm 3 and the fourth bridge arm 4 are connected in series, and the series branch formed by the first bridge arm 1 and the second bridge arm 2 is connected in parallel to the series branch formed by the third bridge arm 3 and the fourth bridge arm 4. The specific topology of the bridge arms will be described below in detail.

Each of the first bridge arm 1 and the third bridge arm 3 is formed by connecting N diodes ($D_{s11}$-$D_{s1N}$ and $D_{s31}$-$D_{s3N}$) in series. Each of the second bridge arm 2 and the fourth bridge arm 4 is formed by connecting N unidirectional breakable modules 5 in series and then connecting them to a second arrester 122 and a fourth arrester 124 in parallel. Each unidirectional breakable module 5 is formed by connecting a full-controlled solid-state switch ($T_{21}$-$T_{2N}$ and $T_{41}$-$T_{24}$) (taking IGBT as example in the figures, but other full-controlled solid-state switches such as GTO or MOSFET may also be possible in practical applications) to a diode ($D_{p21}$-$D_{p2N}$ and $D_{p21}$-$D_{p2N}$) in anti-parallel and then connecting them to a diode ($D_{s21}$-$D_{s2N}$ and $D_{s41}$-$D_{s4N}$) in series in the same direction, where N can be determined according to the parameter determination principle for the conventional DC SSCB. One terminal of a DC reactor L is connected to the PCC between the first bridge arm 1 and the third bridge arm 3, while the other terminal thereof is connected to the cathode of the DC biased power supply. The anode of the DC biased power supply is connected to the PCC between the second bridge arm 2 and the fourth bridge arm 4. The DC reactor can be wound by the copper wire and may also be wound by the superconducting coil in order to reduce the conducting power loss. The DC line is connected to the PCC between the first bridge arm 1 and the second bridge arm 2 and the PCC between the third bridge arm 3 and the fourth bridge arm 4, respectively.

Figure 3:
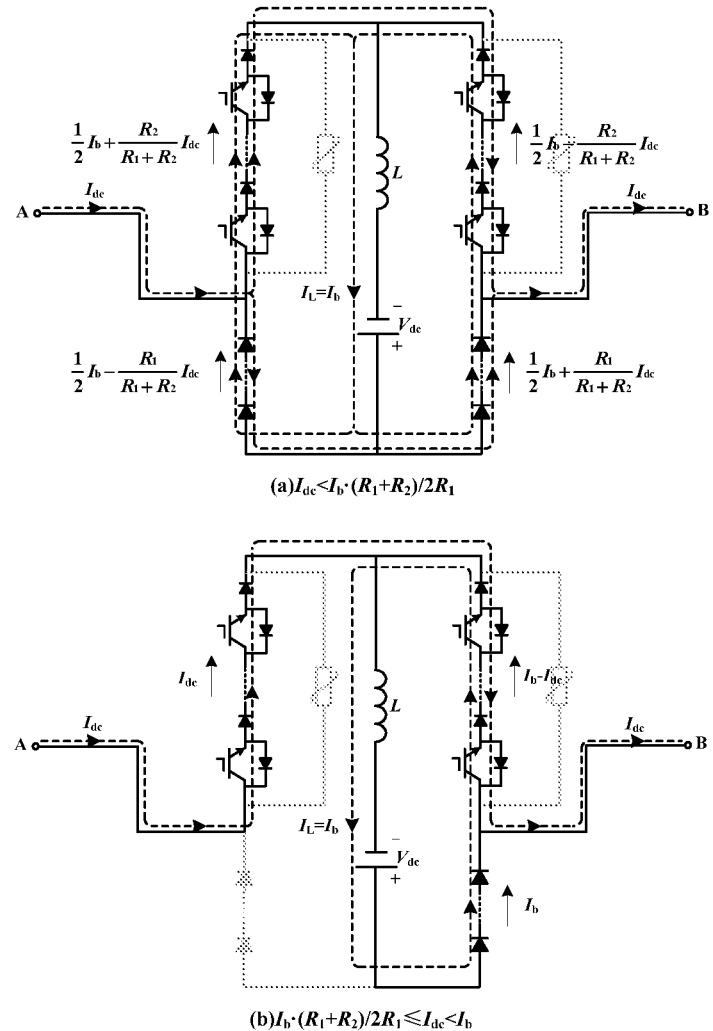
FIG. 3 is the schematic diagram of the DC SSCB according to the present invention during the normal operation state.

FIG. 3 shows the working principle of the proposed DC SSCB (first embodiment) during the normal operation state, taking the line current flowing from point A to point B for instance. In the figure, $R_1$ and $R_2$ represent the on-resistance of the first bridge arm 1 and the second bridge arm 2, respectively, where $R_1 > R_2$; $I_{dc}$ represents the current of the DC line; and, $I_b$ represents the biased current fed by the DC biased power supply. During this state, all the full-controlled solid-state switches (IGBTs) in the DC SSCB are in on state, similarly in the case where the line current flows from B to A. As shown in FIG. 3(a), when the DC current satisfies the condition of $I_{dc} < I_b \cdot (R_1 + R_2)/2R_1$, the bridge arms 1,2,3,4 are all conducted. The line current directly flows through the first bridge arm 1, the third bridge arm 3 and the second bridge arm 2, the fourth bridge arm 4, and the DC reactor current $I_L$ is constantly equal to $I_b$, which means the DC reactor is bypassed from the DC line. As shown in FIG. 3(b), when $I_b \cdot (R_1 + R_2)/2R_1 \le I_{dc} < I_b$, the first bridge arm 1, the third bridge arm 3 and the fourth bridge arm 4 are conducted. The line current directly flows through the first bridge arm 1 and the third bridge arm 3. And the DC reactor current is also equal to $I_b$, so the DC reactor is also bypassed from the DC line. In conclusion, as long as the biased current $I_b$ is set to be a little larger than the maximum load current, the DC reactor in the proposed DC SSCB is bypassed from the DC line. That is, regardless of the size of the DC reactor, its negative influence on the system transient response characteristic and operation stability can be avoided completely. Therefore, the DC reactor can be large enough for fault current limiting.

Figure 4:
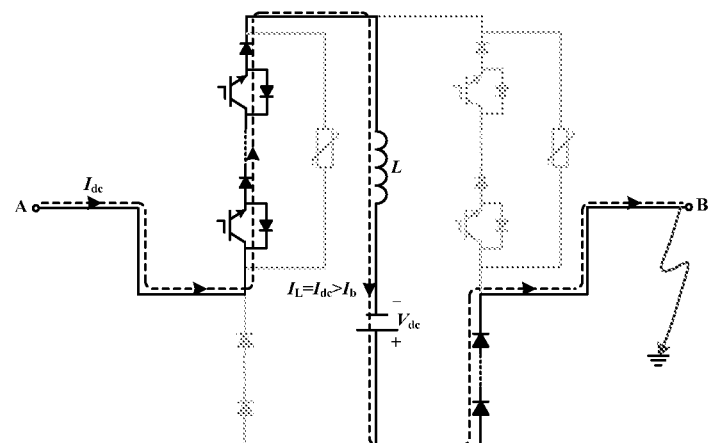
FIG. 4 is the schematic diagram of the DC SSCB according to the present invention during the fault current limiting state and the fault current clearing state.
Figure 4:
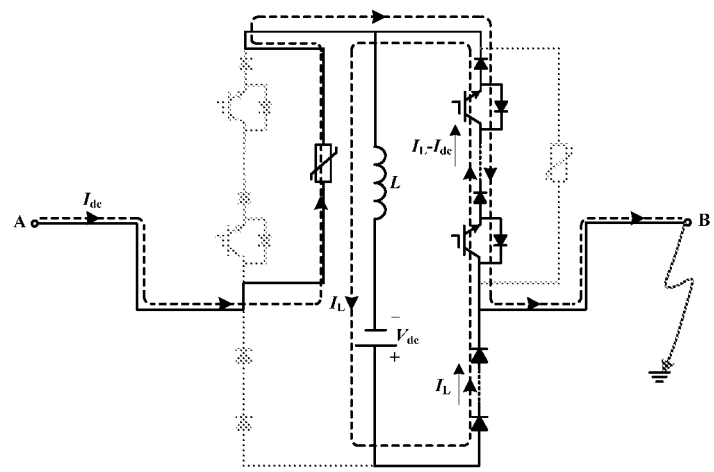

FIG. 4 shows the working principle of the proposed DC SSCB (first embodiment) during the fault current limiting state and the fault current clearing state.

As shown in FIG. 4(a), after a DC faults (before receiving the protection acting signal), the gate signals of the full-controlled solid-state switches (IGBTs) in the DC SSCB are kept unchanged during the normal operation state, e.g. all in on state. Obviously, the DC line current will rapidly rise to exceed the pre-set biased current value $I_b$, and the reactor is instantly and automatically connected into the fault circuit. As $I_b$ is set to be a little larger than the maximum load current, the time from the fault moment to the reactor connected-in moment is very short. It means the proposed SSCB can exert the fault current limiting capability very quickly after the DC fault, and can guarantee the reliable fault ride-through of the remanent healthy network.

As shown in FIG. 4(b), when the protection acts to trip the DC SSCB, the DC SSCB is controlled as follows.

According to the protection judgment information, if the fault is the positive-pole line fault, positive-pole rail fault or the negative-pole bus fault, the switches in the bus-side unidirectional breakable bridge arm of the tripped SSCB will be turned off. If the fault is the negative-pole line fault, negative-pole rail fault or the positive-pole bus fault, the switches in the non-bus-side unidirectional breakable bridge arm of the tripped SSCB will be turned off. With the above control, the fault energy in the fault circuit can be dissipated by the arrester in the turned-off unidirectional breakable bridge arm, and the DC fault current can be cleared quickly.

In this state, the freewheeling current of the DC reactor produces a reverse electromotive force to make the unidirectional breakable bridge arm and the series-connected diode bridge arm conduct automatically. Therefore, the freewheeling current of the DC reactor will only circulate in the SSCB, which means the DC reactor in the proposed SSCB is bypassed from the fault circuit again. In other words, the DC line fault current does not flow through the DC reactor during the fault current clearing period. The arrester only needs to dissipate the fault energy stored in the line, without dissipating the fault energy in the DC reactor. Consequently, the isolating speed of the proposed DC SSCB is much faster compared with the condition that the DC reactors are directly installed in the DC system. This important feature is beneficial to the fast recovery of the healthy network and fast recovery of the fault line insulation characteristic.

Figure 5:
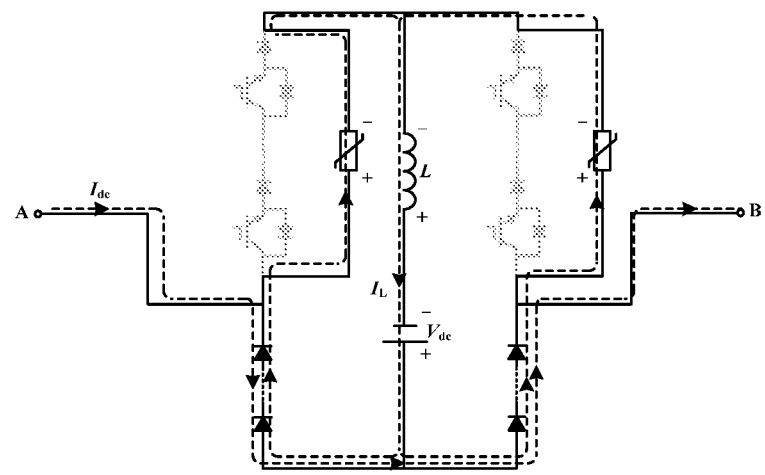
FIG. 5 is the schematic diagram of the DC SSCB according to the present invention during the recovery state.

FIG. 5 shows the working principle of the proposed DC SSCB (first embodiment) during the recovery state. After the fault point is disappeared, the control strategy for the SSCB recovery is designed as following: firstly, turning off one of the unidirectional breakable bridge arm which is still in on state, and then turning off the other unidirectional breakable bridge arm, so that the stored energy in the DC reactor can be dissipated by the arresters; turning on all the full-controlled solid-state switches in the SSCB when the freewheeling current decreases to near the pre-set DC biased current value $I_b$. It means the proposed SSCB is recovered completely so as to prepare for handling the next fault. In addition, the voltage across the SSCB is almost zero, so it can be considered that the recovery of the SSCB almost has no influence on the recovery of the DC system.

The working principle of the topology of the second embodiment of the DC solid-state circuit breaker with self-adapt fault current limiting capability according to the present invention in a normal operation state is as follows: turning on all the full-controlled solid-state switches in the SSCB; setting the biased current $I_b$ to be a little larger than the maximum load current possibly occurring during the normal operation. Under this condition, the DC reactor in the SSCB is bypassed from the DC line, equivalently to being bypassed relative to the external circuit. That is, regardless of the size of the DC reactor, its negative influence on the system transient response characteristic and operation stability can be avoided completely. Therefore, the DC reactor can be large enough for fault current limiting.

The working principle of the topology of the second embodiment of the DC SSCB with self-adapt fault current limiting capability according to the present invention during the fault current limiting state and the fault current clearing state is as follows. After a DC faults (before receiving the protection acting signal), keeping the gate signals of the full-controlled solid-state switches (IGBTs) in the DC SSCB unchanged during the normal operation state, e.g. all in on-state. Obviously, the DC line current will rapidly rise to exceed the pre-set biased current value $I_b$, and the reactor is instantly and automatically connected into the fault circuit. As $I_b$ is set to be a little larger than the maximum load current, the time from the fault moment to the reactor connected-in moment is very short. It means the proposed SSCB can exert the fault current limiting capability very quickly after the DC fault, and can guarantee the reliable fault ride-through of the remanent healthy network.

When the protection acts to trip the DC SSCB, the second embodiment of the DC SSCB with self-adapt fault current limiting capability according to the present invention is controlled as follows. According to the protection judgment information, if the fault is the positive-pole line fault, positive-pole rail fault or the negative-pole bus fault, the switches in the bus-side unidirectional breakable bridge arm of the tripped SSCB will be turned off. If the fault is the negative-pole line fault, negative-pole rail fault or the positive-pole bus fault, the switches in the non-bus-side unidirectional breakable bridge arm of the tripped SSCB will be turned off. With the above control, the fault energy in the fault circuit can be dissipated by the arrester in the turned-off unidirectional breakable bridge arm, and the DC fault current can be cleared quickly.

The working principle of the topology of the second embodiment of the DC SSCB with self-adapt fault current limiting capability according to the present invention during the recovery state is as follows: performing the following control strategy for the SSCB recovery: firstly, turning off one of the unidirectional breakable bridge arm which is still in on state, and then turning off the other unidirectional breakable bridge arm, so that the stored energy in the DC reactor can be dissipated by the arresters; turning on all the full-controlled solid-state switches in the SSCB when the freewheeling current decreases to near the pre-set DC biased current value $I_b$. It means the proposed SSCB is recovered completely sp as to prepare for handling the next fault. In addition, the voltage across the SSCB is almost zero, so it can be considered that the recovery of the SSCB almost has no influence on the recovery of the DC system.

Figure 6:
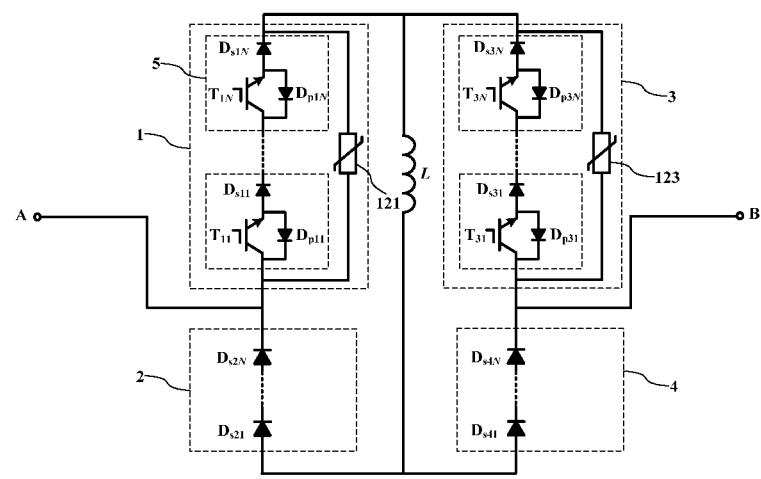
FIG. 6 is the passive topology schematic diagram of the first embodiment of the DC SSCB according to the present invention.
Figure 7:
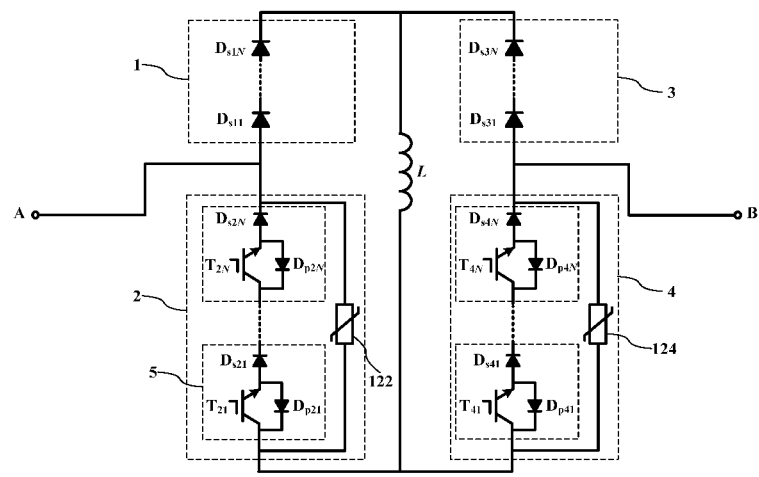
FIG. 7 is the passive topology schematic diagram of the second embodiment of the DC SSCB according to the present invention.

For the two topologies of the novel DC SSCB shown in FIG. 1, if the DC biased power supply is removed, passive topologies of the novel DC SSCB of the present invention are obtained, as shown in FIGS. 6 and 7. The control strategies for the passive topologies are the same with the active ones described above. Compared with the active ones, the passive topologies are also characterized by quick fault current limiting, instantly and automatically bypassing the reactor during the fault current clearing period, and quick recovery after the fault point disappears. But the negative influence on the system normal operation cannot be completely avoided.

What is claimed is:

1. A DC solid-state circuit breaker with self-adapt fault current limiting capability, wherein the topology of the DC solid-state circuit breaker is a H-bridge circuit consisting of two unidirectional breakable bridge arms and two series-connected diode bridge arms; the two unidirectional breakable bridge arms are connected in series to the two series-connected diode bridge arms in a same direction, respectively, to form two series branches; the bridge arms in the two series branches are arranged in the same way of: the unidirectional breakable bridge arms are arranged at high-side and the series-connected diode bridge arms are arranged at lower-side or the series-connected diode bridge arms are arranged at high-side and the unidirectional breakable bridge arms are arranged at lower-side; the series branches are connected in parallel, and the parallel connection of the two series branches follows the rule that the same bridge arms form a point of common coupling; a series branch composed of a DC reactor L and a DC bias power supply is connected to the points of common coupling of the unidirectional breakable bridge arms and the series-connected diode bridge arms, respectively; and, the DC line is connected to the above two points of common coupling.

2. The DC solid-state circuit breaker with self-adapt fault current limiting capability according to claim 1, wherein each of the unidirectional breakable bridge arms is formed by connecting N unidirectional breakable modules in series and then connecting them to a arrester in parallel; and, each of the unidirectional breakable modules is formed by a full-controlled solid-state, an anti-paralleled diode and a series-connected diode.

3. The DC solid-state circuit breaker with self-adapt fault current limiting capability according to claim 1, wherein each of the series-connected diode bridge arms consists of N diodes connected in series.

4. A method for controlling a DC solid-state circuit breaker with self-adapt fault current limiting capability, comprising control strategies for the normal operation state, the fault current limiting state, the fault current clearing state and the recovery state, wherein the control strategies specifically comprise the following processes:

during normal operation state, turning on all the full-controlled solid-state switches in the solid-state circuit breaker; setting the biased current $I_b$ to be a little larger than the maximum load current possibly occurring during the normal operation; under this condition, the DC reactor in the solid-state circuit breaker is bypassed from the DC line;

in the fault current-limiting state, after DC faults, keeping the gate signals of the full-controlled solid-state switches unchanged until the protection action signal is received; rising the DC line current to exceed the DC biased current value $I_b$, and quickly connecting a DC reactor to a fault circuit after the fault occurred; since the biased current value $I_b$ is set to be a little larger than the maximum load current, the time from the fault moment to the reactor connected-in moment is very short, thus achieving the current limiting effect quickly after the fault occurred, preventing the rapid drop of the DC voltage, and guaranteeing the reliable fault ride-through of the remanent healthy network;

in the arrangement of arranging the unidirectional breakable bridge arms at high-side and the series-connected diode bridge arms at lower-side: in the fault current clearing state, when the protection acting signal is received, turning off the corresponding full-controlled solid-state switches in the unidirectional breakable bridge arm, getting into the fault current clearing state, but the turned-off arm is different according to the fault conditions; if the fault is the positive-pole line fault, positive-pole rail fault or the negative-pole bus fault, turning off the switches in the non-bus-side unidirectional breakable bridge arm of the tripped solid-state circuit breaker; with the above control, the fault energy in the fault circuit can be dissipated by the arrester in the turned-off unidirectional breakable bridge arm, and the DC fault current can be cleared quickly; in this case, the freewheeling current of the DC reactor produces a reverse electromotive force to make the unidirectional breakable bridge arm and the series-connected diode arm conduct automatically; therefore, the freewheeling current of the DC reactor will only circulate in the solid-state circuit breaker, which means the DC reactor in the proposed solid-state circuit breaker is bypassed from the fault circuit again; the described control strategy for the fault current clearing state is for the topology that the unidirectional breakable bridge arms at high-side and the series-connected diode bridge arms at lower-side; differently, for the topology the series-connected diode bridge arms at high-side and the unidirectional breakable bridge arms at lower-side, the control strategy is opposite; and in the arrangement of arranging the series-connected diode bridge arms at high-side and the unidirectional breakable bridge arms at lower-side, during recovery state, when the fault point is disappeared, performing the following control strategy for the solid-state circuit breaker recovery: firstly, turning off one of the unidirectional breakable bridge arms which is still in on state, and then turning off the other unidirectional breakable bridge arm, so that the stored energy in the DC reactor can be dissipated by the arresters; turning on all the full-controlled solid-state switches in the solid-state circuit breaker when the freewheeling current decreases to near the pre-set DC biased current value $I_b$; it means the proposed solid-state circuit breaker is recovered completely, to prepare for handling the next fault; in addition, the voltage across the solid-state circuit breaker is almost zero, so it can be considered that the recovery of the solid-state circuit breaker almost has no influence on the recovery of the DC system.

* * * * *